US011557424B2

(12) United States Patent
Moreno et al.

(10) Patent No.: US 11,557,424 B2
(45) Date of Patent: Jan. 17, 2023

(54) WINDING UNIT HAVING TAPS CONFIGURED ON THE SUPPORT

(71) Applicant: Siemens Energy Global GmbH & Co. KG, Munich (DE)

(72) Inventors: Andre Luiz Moreno, Varzea Paulista (BR); Martin Alsina Navarro, Jundiai (BR); Richard Sille, Kirchheim (DE)

(73) Assignee: Siemens Aktiengesellschaft, Muechen (DE)

( * ) Notice: Subject to any disclaimer, the term of this patent is extended or adjusted under 35 U.S.C. 154(b) by 234 days.

(21) Appl. No.: 16/765,945

(22) PCT Filed: Oct. 24, 2018

(86) PCT No.: PCT/EP2018/079127
§ 371 (c)(1),
(2) Date: May 21, 2020

(87) PCT Pub. No.: WO2019/101460
PCT Pub. Date: May 31, 2019

(65) Prior Publication Data

US 2020/0357566 A1 Nov. 12, 2020

(30) Foreign Application Priority Data

Nov. 21, 2017 (DE) ............................ 102017220779

(51) Int. Cl.
*H02H 3/00* (2006.01)
*H01F 27/29* (2006.01)
*H01F 27/32* (2006.01)

(52) U.S. Cl.
CPC ........... *H01F 27/29* (2013.01); *H01F 27/327* (2013.01)

(58) Field of Classification Search
None
See application file for complete search history.

(56) References Cited

U.S. PATENT DOCUMENTS 2,431,244 A 11/1947 Griscom
4,159,457 A * 6/1979 Charpentier ........ H01F 27/2866 336/183

(Continued)

FOREIGN PATENT DOCUMENTS

AT 181318 B 3/1955
DE 878406 B 6/1953

(Continued)

*Primary Examiner* — Stephen W Jackson
(74) *Attorney, Agent, or Firm* — Laurence A. Greenberg; Werner H. Stemer; Ralph E. Locher

(57) ABSTRACT

A winding unit for connecting to a high-voltage grid or network includes a winding embedded in a solid insulating body and a first main connection terminal connected to a first winding end of the winding and disposed on a first support formed on the insulating body. A second main connection terminal is connected to a second winding end of the winding. The winding has partial windings and taps for adjusting the number of windings of the partial windings connected in series. Outgoing lines extending in the insulating body connect the taps to a tap connection terminal accessible from the outside. The tap connection terminals are formed on the support in order to encapsulate the higher voltage in a resin block over the entire periphery by using a shielding cage.

5 Claims, 5 Drawing Sheets

(56) References Cited

U.S. PATENT DOCUMENTS

| | | | | |
|---|---|---|---|---|
| 2004/0178873 | A1* | 9/2004 | Kohno | .................. H01F 27/325 336/180 |
| 2013/0043966 | A1 | 2/2013 | Singh | |
| 2014/0118101 | A1 | 5/2014 | Navarro | |

FOREIGN PATENT DOCUMENTS

| | | | |
|---|---|---|---|
| DE | 2640595 | A1 | 3/1978 |
| KR | 20160121645 | A | 10/2016 |

* cited by examiner

WINDING UNIT HAVING TAPS CONFIGURED ON THE SUPPORT

BACKGROUND OF THE INVENTION

Field of the Invention:

The invention relates to a winding unit for connecting to a high-voltage grid, having a winding which is embedded in a solid insulating body, a first connection terminal which is connected to a first winding end of the winding and is arranged on a first support which is formed on the insulating body, and a second connection terminal which is connected to a second winding end of the winding, wherein the winding comprises partial windings and taps, by means of which the number of series-connected turns of the partial windings can be adjusted, and which are respectively connected, by means of an outgoing line which extends in the insulating body, to a tap connection terminal which is accessible from the exterior.

In practice, a winding unit of this type will be known to a person skilled in the art, wherein the known winding unit is illustrated in an end face view in FIG. 1, and in a sectional side view in FIG. 2. The known winding unit 10 comprises an insulating body which is configured in the form of a resin block 11, in which a higher-voltage winding 12 is arranged. The higher-voltage winding 12 is comprised of a first partial winding 13 and a second partial winding 14, the mutually facing winding ends of which are connected to tap connection terminals 5 or 6 by means of outgoing lines 15 and 16 which extend through the resin block 11, and are contact-connectable from the exterior. Moreover, four further tap connections 17 can be seen, which are likewise connected by means of outgoing lines 18 to the tap connection terminals 3, 4, 7 and 8. Hereinafter, the term "tap connection" describes the location in the winding at which the respective turn thereof is contact-connected with the respective outgoing line 18.

An upper main connection terminal 19 can be seen at the free end of a support 1 which is formed on the resin block 11. A lower main connection terminal 20 is correspondingly configured at the free end of a support 2 which is likewise formed on the resin block 11. In order to interconnect the main connection terminals 19 and 20, it is necessary for two tap connection terminals to be connected to one another. By the connection of the tap connection terminals 5 and 6, the number of series-connected turns of the higher-voltage winding 12 is at a maximum. Connection of the tap connection terminals 4 and 7 results in the series connection of an intermediate number of turns, whereas a connection of the tap connection terminals 3 and 8 results in the series connection of turns, the number of which is comparatively the smallest.

In FIG. 1, the tap connection terminals 3 and 8 are interconnected by means of a terminal strip 21. Accordingly, in the example represented, approximately −5% of the nominal voltage can be tapped off at the main connection terminals 19 and 20. By the connection of the tap connection terminals 3 and 7, the prevailing voltage on the latter would be of the order of −2.5% whereas, by the connection of the tap connection terminals 4 and 6, the voltage which can be tapped off would be of the order of +2.5%.

The known winding unit is handicapped by a disadvantage, in that the outgoing lines 15, 16 and 18 which are centrally routed through the resin block prevent the enclosure of the higher-voltage winding in a shielding cage over its entire periphery. In order to permit the passage of the outgoing lines 15, 16 and 18, the shielding cage would be required to incorporate an opening, as a result of which the shielding effect would be negated.

SUMMARY OF THE INVENTION

The object of the invention is the provision of a winding unit of the abovementioned type which permits the higher voltage to be encapsulated in the resin block over its entire periphery, by means of a shielding cage.

This object is fulfilled by the invention by configuring the tap connection terminals on the support.

Conversely to the known solution from the prior art, within the context of the invention, the tap connection terminals are no longer centrally configured on the insulating body or, in other words, the winding block, but are configured in combination with one of the main connection terminals on the support. As the support is generally arranged at the end face of the higher-voltage winding which is arranged in the insulating body, the connecting lines of the taps can also be brought out of the end face of the winding. In this manner, connecting lines which extend out of the insulating body in a transverse direction from a centrally arranged tap in the insulating body are eliminated. Accordingly, the winding unit can be equipped with a shielding in the insulating body which entirely encloses the winding, in the manner of a cage. The shielding is advantageously arranged in the immediate vicinity of the winding. The winding is advantageously a higher-voltage winding, which is consequently rated for higher voltages and lower currents.

Advantageously, each support assumes a rotationally symmetrical configuration and is equipped with ribs, wherein each support extends in a longitudinal direction, and the tap connection terminals between two ribs are arranged in an evenly-distributed manner over the periphery of the respective support. According to this advantageous configuration of the invention, ribs are provided on the support in order to extend the path for creepage currents, such that the latter, insofar as possible, are entirely suppressed. Creepage currents are undesirable, as these can compromise the dielectric strength of the insulating body.

Advantageously, the first main connection terminal is configured at the free end of the support.

Advantageously, the first turn of the higher-voltage winding is connected to the main connection terminal by means of an outgoing line which extends over the full length of the support.

In one configuration of the invention, the tap connection terminals are arranged with an offset in relation to the insulating body, and are thus configured with a clearance to the first main connection terminal.

In a further variant, all the tap connection terminals are arranged at the same level, and are spaced from the first main connection terminal by means of at least one rib. It is appropriate that the number of turns between the first end face turn of the winding and the taps should be as small as possible. The potential difference between the first main connection terminal and the tap connection terminals on the support would otherwise be too great for the latter to be arranged in combination on one support and separated from one another by one rib only.

Advantageously, the number of turns of the first partial winding, the uppermost end face turn of which is connected to the first main connection terminal and the final turn of which is connected to a tap connection terminal on the support, lies between 1 and 20, conversely to the number of turns of the second partial winding, the first end face turn of which is connected to a tap connection terminal and the final turn of which is connected to the second main connection terminal.

Appropriately, a second support is provided, which extends from the winding body at the free end thereof, wherein the second main connection terminal is configured at the free end of the second support. According to this advantageous further development, two main connection terminals are provided, each of which is arranged at the free end of a support. Between the connection terminals, by bridging of the appropriately selected tap connection terminals, the number of turns between the first and the second main connection terminal, and thus the voltage, can be adjusted.

According to an appropriate further development with respect hereto, the second support also comprises ribs. Here again, the function of said ribs is to extend the creepage path, thereby increasing the dielectric strength of the winding unit.

Advantageously, the insulating body and each of the supports are comprised of a cured resin. As an appropriate resin, epoxy resin can be considered for this purpose, wherein appropriate admixtures are added to the resin for the curing thereof. However, insulating bodies of resin will be known to a person skilled in the art, such that any detailed descriptions thereof can be omitted at this point.

According to a preferred configuration of the invention, a flexible cap which is attached to the support is provided, the function of which is to protect the tap connection terminals. The cap, for example, is formed of a flexible elastomer, and serves for the exclusion of dirt, rainwater or similar. On the grounds of the flexibility of the cap, the latter can be pulled over the respective ribs of the support, optionally over the tap connection terminals.

Further advantageous configurations and advantages of the invention are the subject matter of the following description of exemplary embodiments of the invention, with reference to the figures and the drawing, wherein identically functioning components are identified by the same reference numbers.

DETAILED DESCRIPTION OF THE INVENTION

Figure 1:
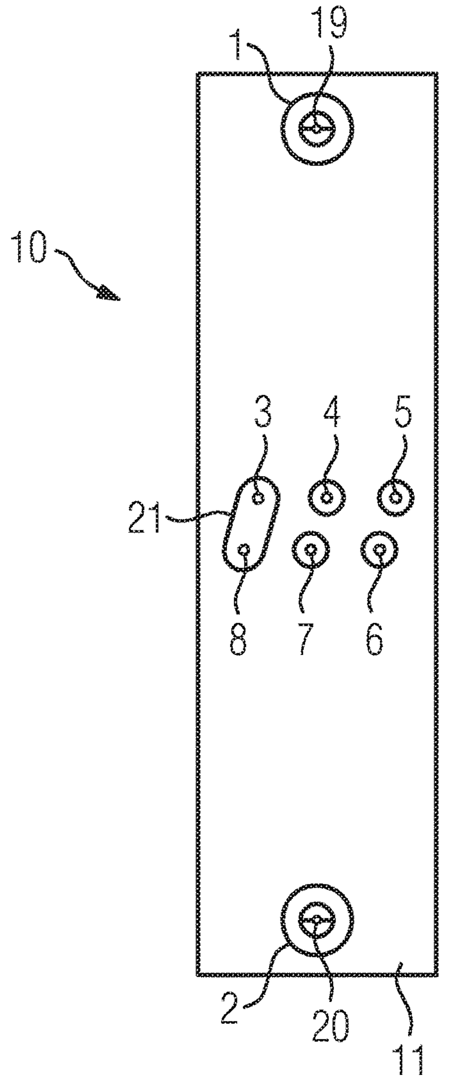
FIGS. 1 and 2 illustrate a winding unit according to the prior art in an end face view or a sectional side view.
Figure 2:
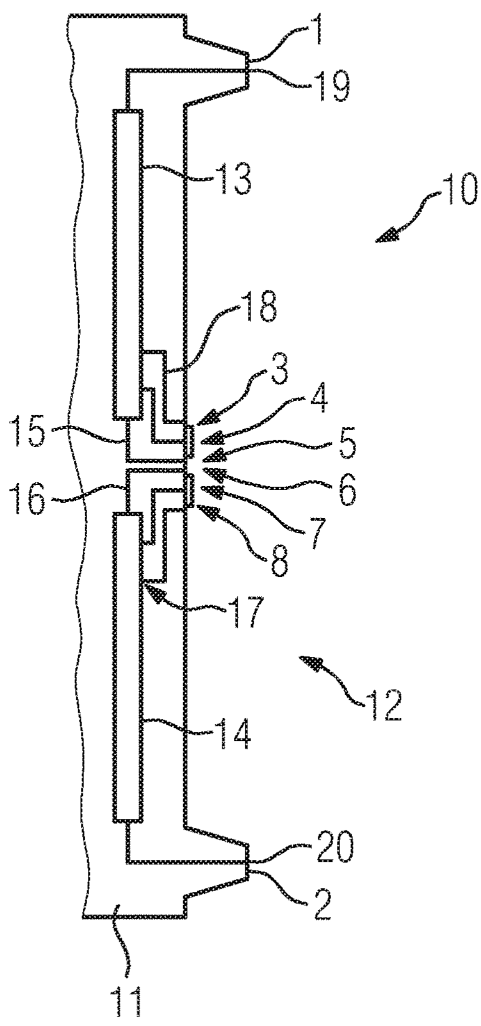

FIGS. 1 and 2 show a winding unit according to the prior art, of the type which has already been described in detail, such that any further representation can be omitted.

Figure 3:
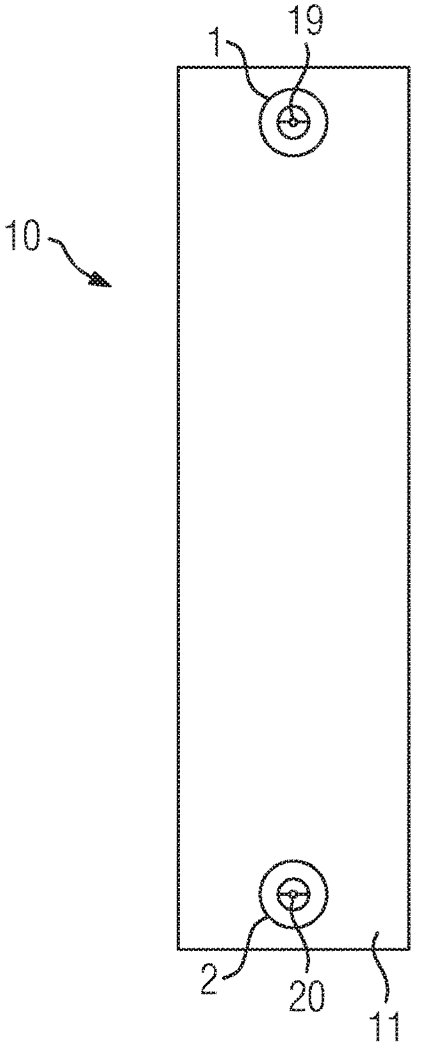
FIGS. 3 and 4 illustrate a winding unit according to the present invention in an end face view or in a sectional side view.
Figure 4:
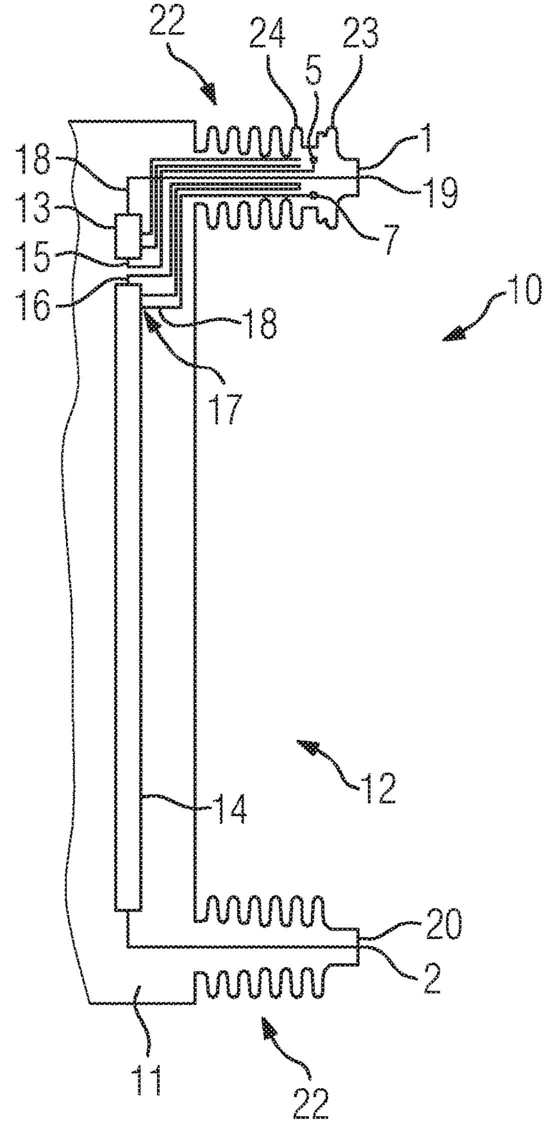

FIG. 3 shows an exemplary embodiment of the winding unit 10 according to the invention, in an end face view. FIG. 4 shows the winding unit according to FIG. 3 in a sectional side view.

The winding unit 10 according to the invention represented in FIGS. 3 and 4 comprises a solid winding body, which is configured as a resin block 11. A winding 12 is embedded in the resin block 11. The winding 12 which, in this case, is configured as a higher-voltage winding 12, further comprises a first partial winding 13 and a second partial winding 14, which are galvanically isolated from one another. The uppermost winding layer of the first partial winding 13 is connected to the first main connection terminal 19 of a support 1 by means of an outgoing line 18. The first main connection terminal 19 is arranged at the free end of the support 1, which is averted from the insulating body 11. The final winding layer of the first partial winding 13—as per the prior art according to FIGS. 1 and 2—is connected by means of an outgoing line 15 to the tap connection terminal 5 which, however, conversely to the winding unit represented in FIG. 1, is configured on the support 1. The same applies correspondingly to the tap connection terminals 3 and 4, which are likewise connected to taps 17 on the first partial winding 13. The first winding layer of the second partial winding 14 is in turn connected by means of an outgoing line 16 to the tap connection terminal 6, which is likewise arranged on the support 1. The same applies correspondingly to the tap connection terminals 7 and 8, which are connected by means of outgoing lines 18 to taps 17 on the second partial winding 14. All the outgoing lines 15, 16 and 18 of the partial winding 13, 14 thus extend through the support 1 to the terminals which are configured thereupon. According to the invention, outgoing lines in the center of the winding 12 and the winding body 11 are eliminated.

The partial windings 13, 14 moreover differ with respect to the number of turns. Whereas, in the winding unit 11 according to FIG. 2, the first partial winding 13 and the second partial winding 14 are virtually identically dimensioned and comprise an approximately equal number of turns, the first partial winding 13 in the exemplary embodiment of the invention represented in FIG. 4 assumes significantly smaller dimensions, and is provided with fewer turns than the second partial winding 14. This provides an advantage, in that it is not necessary for the outgoing lines 15, 16 and 18 to be routed over an unnecessarily long distance, parallel to the winding 12, to the support 1 in the resin block 11, such that the winding unit 10 according to the invention can be configured in a simpler and more cost-effective manner.

In FIG. 4, it can further be seen that the support 1 assumes a rotationally symmetrical configuration and constitutes ribs 22, the function of which is to extend the creepage current path and thus increase dielectric strength. It can moreover be seen that all the tap connection terminals 3, 4, 5, 6, 7 and 8 are commonly arranged between the first and second ribs 23 and 24 of the support 1.

The support 2, at the free end of which the second main connection terminal 20 is located, is also equipped with external ribs 22.

Figure 5:
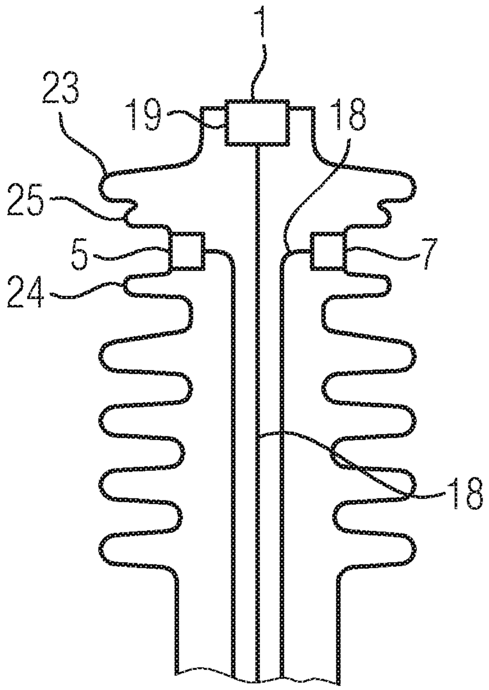
FIGS. 5 and 6 illustrate an exemplary embodiment of a support in a sectional side view or transverse view.

FIG. 5 shows the support 1 with the first main connection terminal 19 in a sectional view, in which only the tap connection terminals 7 and 5 can be seen, which are respectively connected to the final and the first turn of the first partial winding 13. The tap connection terminal 7 is connected by means of the outgoing line 18 to a tap 17 on the second partial winding 14.

Figure 6:
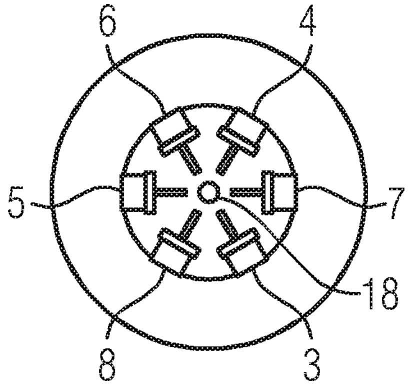

FIG. 6 shows the support 1 according to FIG. 5 in an overhead view. In this case, all the tap connection terminals 3, 4, 5, 6, 7 and 8, together with the central connecting line 18 for the first main connection terminal 19, can be seen.

In FIG. 5, it is further shown that the first rib 23 incorporates an under-rib 25, which assumes an approximately equal radius to the second rib 24. The tap connection terminals are arranged below the under-rib 25 and the second rib 24. The second connection rib 24 is configured with a somewhat shorter radial dimension than the remaining ribs 22 of the support 1. The pull-over fitting of a flexible cap onto the second rib 24 and the under-rib 25 is simplified accordingly.

Figure 7:
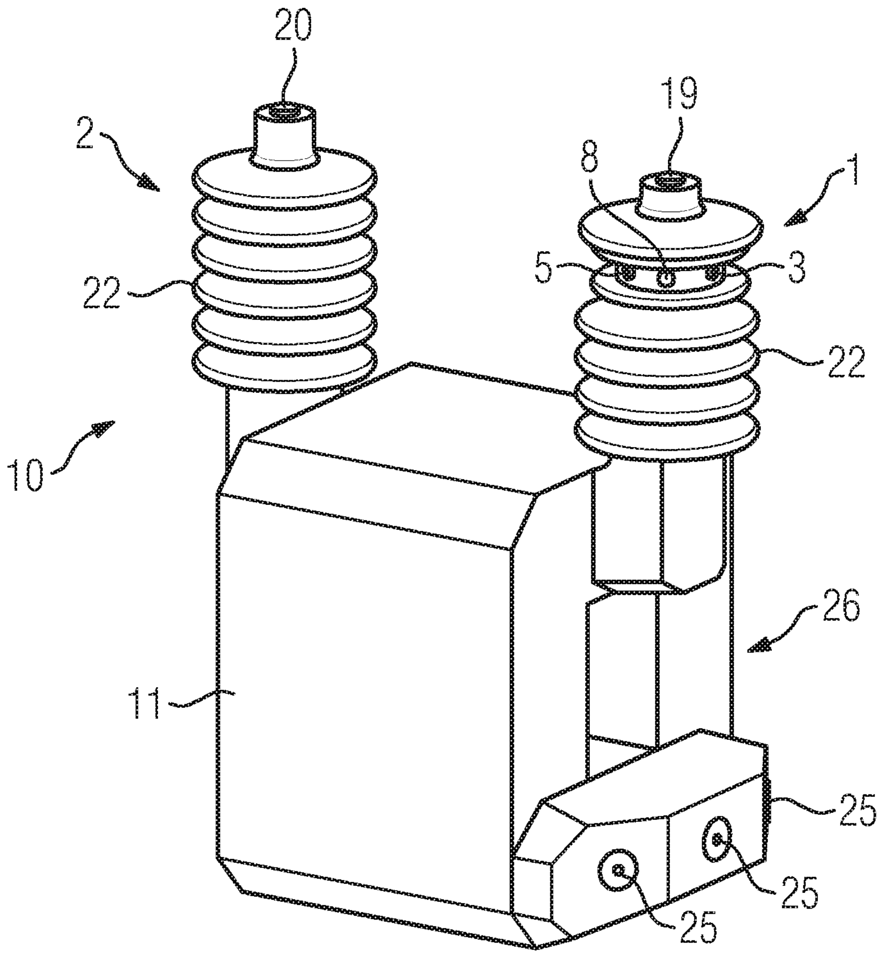
FIG. 7 illustrates an exemplary embodiment of the winding unit according to the invention, in a perspective view.
Figure 8:
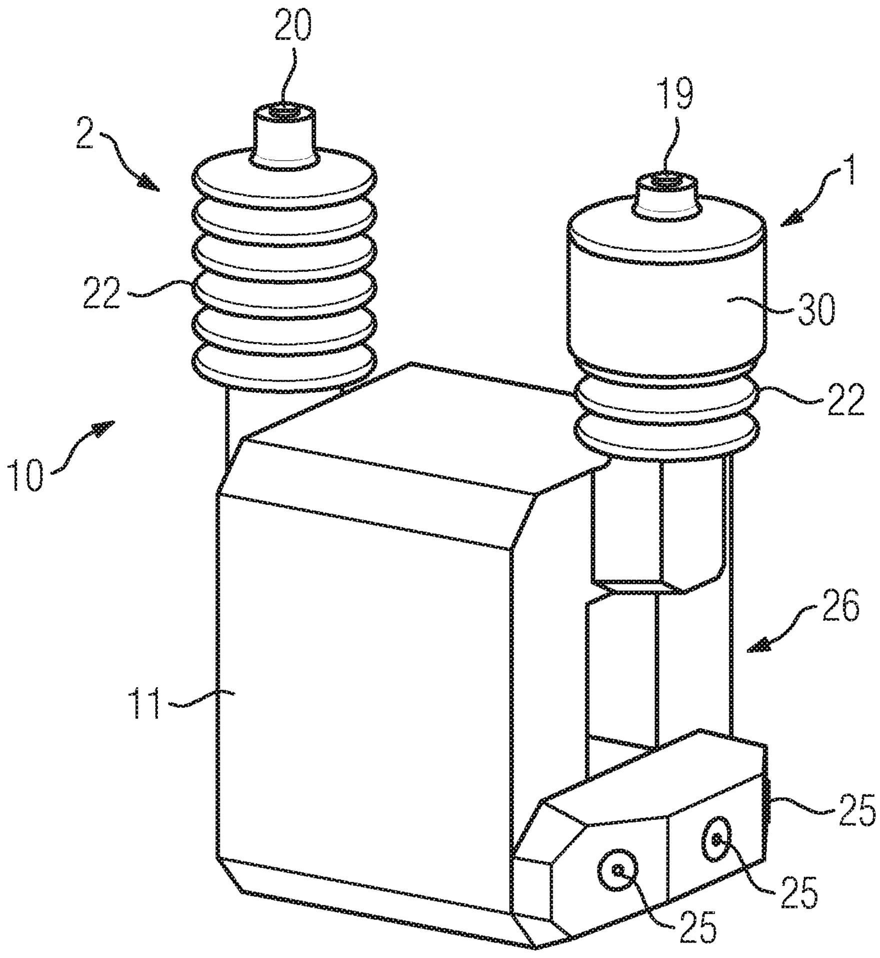

FIG. 7 shows a perspective representation of the winding unit 10, in which it can be seen that the tap connection terminals 3, 4, 5, 6, 7 and 8 are evenly distributed over the periphery of the support 1, and are thus arranged with an equal radial spacing in relation to one another. The second support 2, with the second main connection terminal 20, can moreover be seen. The resin block 11 is further represented, in which a higher-voltage winding and two lower-voltage windings are arranged. The higher-voltage winding is connected on the input side to the main connection terminals 19 and 20, wherein the lower-voltage windings are electrically connected to the lower-voltage terminals 25. The winding body 11 is configured with a central installation opening 26, which is provided for the accommodation of a core limb. The core limb is part of a magnetizable core unit, which extends around the winding body 11 in a crown-shaped arrangement, for the inductive coupling of the windings, although said unit is not diagrammatically represented.

The invention claimed is:

1. A winding unit for connecting to a high-voltage grid, the winding unit comprising:

a solid insulating body;

a first support formed on said insulating body;

a second support formed on said insulating body;

each of said supports having a rotationally symmetrical configuration and being equipped with ribs;

each of said supports extending in a longitudinal direction;

a winding embedded in said solid insulating body, said winding having first and second winding ends, and said winding including partial windings having series-connected turns and taps for adjusting a number of said series-connected turns;

a first main connection terminal connected to said first winding end of said winding and disposed on said first support;

a second main connection terminal connected to said second winding end of said winding;

externally-accessible tap connection terminals disposed on said first support, said tap connection terminals each being disposed between two of said ribs and evenly-distributed over a periphery of a respective one of said supports; and outgoing lines extending in said insulating body, said outgoing lines connecting said partial windings to said tap connection terminals.

2. The winding unit according to claim 1, wherein said first main connection terminal is disposed at a free end of said first support.

3. The winding unit according to claim 1, wherein said second support extends from a free end of said insulating body, said second main connection terminal being disposed at said free end of said second support.

4. The winding unit according to claim 3, wherein said insulating body and each of said supports are formed of a cured resin.

5. The winding unit according to claim 1, which further comprises a flexible cap attached to said first support for protecting said tap connection terminals.

* * * * *